Patented Sept. 2, 1924.

1,507,379

UNITED STATES PATENT OFFICE.

WILLIAM HOSKINS, OF CHICAGO, ILLINOIS, ASSIGNOR TO ECONOMY FUSE & MANUFACTURING COMPANY, OF CHICAGO, ILLINOIS, A CORPORATION OF NEW YORK.

PLASTIC.

No Drawing.  Application filed March 17, 1921.  Serial No. 452,953.

*To all whom it may concern:*

Be it known that I, WILLIAM HOSKINS, a citizen of the United States, residing at 111 West Monroe Street, Chicago, in the county of Cook and State of Illinois, have invented new and useful Improvements in Plastics, of which the following is a specification.

In accordance with the present invention a cement is prepared by admixing with an inert material a primary binding constituent which will cause the cement to set when treated with a solution of phosphoric acid, this binding material being an aluminate of a metal of the alkali or alkaline earth groups.

The primary binding constituent of the cement may be prepared by intimately admixing alumina or aluminum hydrate and an oxide or carbonate of an alkali or alkaline earth metal and calcining the mixture. The aluminum compound should be present in equimolecular proportions or in excess, the excess of the calcined alumina being, in the latter case, incorporated in the cement as a part of the inert material or filler. The temperature of calcining should be sufficiently high to cause reaction, but may in general be not higher than sintering temperature. With higher temperatures care must be taken to avoid decomposition of the aluminate. A temperature of approximately 1000° C. (and below 1300° C.) is satisfactory for the production of the aluminate in substantially all cases. Thus 100 parts of calcium carbonate and 140 parts of aluminum hydroxide (equimolecular proportions) may be calcined at 1000–1100° C. until no more $CO_2$ is evolved, the resulting aluminate material being a binding material suitable for use in accordance with my invention. An excess of the aluminum compound may likewise be employed; for example, in one case I have employed 120 parts of aluminum hydroxide and 7 parts of calcium carbonate, calcining the mixture at 1000°–1300° C. The excess of alumina in the calcined mixture is incorporated in the cement as a part of the filler.

An oxide, hydrate or carbonate of any metal of the alkali and alkaline earth groups may be substituted for the calcium carbonate in the above example in whole or in part. Thus sodium carbonate, potassium carbonate, magnesium oxide, magnesite or dolomite, etc., may be employed.

It is preferred that the constituents of the mixture to be calcined be very finely ground; for example, of sufficient fineness to pass through a 200-mesh screen, or finer.

The aluminate binding constituent may likewise be prepared by wet methods; for example, by treating hydrated alumina with a caustic alkali or by reaction of a caustic alkali on a dissolved aluminum salt.

In preparing the cement the aluminate binding material is admixed with a suitable inert or non-bonding filler, such as silica, alumina, and the like, the proportion of binding material being not less than 2% of the whole. The proportion of binder present influences the rate of set, the greater the proportion of binder the more rapid the set. In general, for technical purposes, it is preferred that the proportion of binder do not exceed 10%, as with more than 10% of the aluminate binder the rate of setting is too rapid for general technical use. With 2% of the aluminate binder in the mixture a temperature above ordinary atmospheric temperature is necessary to produce a set in a reasonable time, a temperature of 100–150° C. being preferred. With 3–4% of aluminate binder, say, calcium aluminate, a period of above 30 days is required for setting at ordinary temperatures, the final set not being reached for 2 to 3 months; at 110–115° C. from 12–24 hours is required, and at 140–150° C. 2 to 3 hours is sufficient for the set although a longer period, say, 10 to 12 hours or more is preferred. In very rapidly setting cements, such as dental porcelains, the proportion of binder employed exceeds 10%, and may be as high as 65–75%.

Any inert material may be employed as a filler and any suitable inert pigment materials may be used for coloring the cement. The tensile strength of the material is affected by the character of the filler, a higher tensile strength being secured with materials of sharply angular character, particularly materials having a conchoidal fracture. Thus silica may be employed as a filler in the form of crushed quartz or of decomposed silica, the former, under ordinary cold pressing, producing a cement having a higher tensile strength. Crushed glass or amorphous fused silicates may be employed and for many uses are highly desirable in that their indices of refraction and color may be chosen at will, and by reason of their high elasticity and resiliency. Other inert materials may be employed in accordance with the desired properties of the final molded article, such as barium sulfate, asbestos fiber or powder, clay, calcined alumina, dead burned gypsum and magnesite, etc. Fillers such as calcined alumina and hydraulic gypsum influence the rate of set by reason of their facility of combination with water, thereby increasing the concentration of the setting liquid. They are, however, inert in that they do not otherwise appear to partake in the setting reaction. The greater the proportion of such fillers, other factors being the same, the slower the set, in the measure that the concentration of the setting liquid is increased by the dehydrating action of the filler constituent. With increase in concentration an increase in the tensile strength of the molded article is found.

The setting liquid to be admixed with the cement to produce the plastic material is a solution of phosphoric acid, which may, if desired, contain phosphates. A liquid suitable for use in commercial practice may be prepared by mixing 308 parts by weight of 85% phosphoric acid, 60 parts by weight of zinc oxide and 135 parts by weight of water. The proportions of the constituents may be varied and the zinc oxide may be omitted entirely or may be partially or completely replaced by other oxides or phosphates, for example, aluminum oxide, sodium hydroxide, sodium phosphate, etc. Thus, in the manufacture of synthetic porcelains or dental cements, the zinc oxide or any substitute therefor, may be omitted, the liquid then containing phosphoric acid and water. The concentration of phosphoric acid in the liquid influences the rate of setting and the tensile strength of the molded article, as with concentrations of phosphoric acid above that set forth supra, the filler remaining unchanged, the rate of setting is decreased and the tensile strength increased. The concentration of phosphoric acid may be varied by varying the relative proportions of phosphoric acid and water in the mixture, or, as hereinbefore set forth, it may also be varied by the use of dehydrating fillers, that is, fillers capable of chemically combining with water and thereby increasing the concentration of the phosphoric acid. The proportion of liquid to cement should be sufficient to cause at least a wetting of the particles of the cement by the liquid. In the case of commercial cements, intended to be molded, for example, under pressure in dies, the proportion of liquid should not be so great as to make the mass stickly or tacky when compressed. Thus, with a cement containing about 3% of binder, that is, calcium aluminate, and with quartz and alumina as fillers the proportion of liquid of the specific composition above set forth may suitably be about 35 parts to 100 parts of cement (by weight). With cements for dental use which are employed in a highly plastic state and contain large proportions of the binder, much larger proportions of the setting liquid may be used; for example, the setting liquid and cement may be in equal proportions by weight.

It is readily apparent that cements prepared in accordance with the present invention may be controlled within wide limits as to their behavior, particularly in setting, and that their physical character may be greatly varied. As an example of a cement which can be used for cold molding, I may prepare a mixture of one part ignited alumina and two parts of silica, preferably in the form of crushed quartz, and add to the mixture 3% of calcium aluminate binder, prepared as above set forth. The mixture, preferably finely ground to about 200 mesh or less and thoroughly mixed, is admixed with setting liquid, for example, of the proportions described above for use in commercial practice, the liquid and the cement being in the proportion of about 1 to 3 by weight. The mixture is plastic under pressure and may be molded into the desired form in a cold press under a suitable pressure, say 2-25 tons or higher. When the mixture is fresh it shows a tendency to stick to the dies. This tendency appears to disappear after the mixture has aged somewhat, say 12 hours or longer. The pressed article has sufficient coherence to permit handling. At ordinary temperatures upwards of a month is required to cause it to set. By heating to 110 to 115° C. it may be caused to set in about 12 hours or more, a longer time being preferred. At a temperature of 140 to 150° an initial setting may be effected in one-half to one hour; a longer setting period, say 12–18 hours is preferred. The plastic mixture of cement and liquid may be molded for a considerable period after it has been admixed, provided it is kept at ordinary temperature or cooler. It molds well even after ten days to two weeks standing.

As has been set forth earlier in this specification, the filler constituents of the cement may be greatly varied. Thus, in the preceding example, the proportions of alumina to silica may be one to four, the resulting molded article, after setting, having very nearly the same tensile strength and hardness as one prepared from a mixture of one part alumina and two parts silica. In either case the final material has a tensile strength equal to or exceeding that of Portland cement. Alumina alone may be employed, in which the final article appears to be less hard than when silica is used in the filler. Silica alone may likewise be employed. Either the alumina or the silica, or both, may be replaced in whole or in part by other fillers, such as crushed glass, asbestos fiber, dead burnt or hydraulic gypsum, dead burnt magnesite, etc., the characteristics of these fillers having already been set forth. Organic fillers of an inert character, such as wood or cork flour, cotton flocks and the like may likewise be employed. With such fillers there is, however, a tendency to discoloration by carbonization when the final article is set with the aid of heat. Pigment fillers may, of course, be employed as desired. If more rapid setting is desired, higher proportions of the binder may be used. Although in the example calcium aluminate is stated to be the binder, any aluminate of an alkali or an alkali earth metal may be employed, or mixtures thereof may be used, as fully set forth earlier in the specification.

Where alumina is used in the filler, as in the previous instance, an excess of alumina may be calcined or sintered with the alkali metal or alkali earth metal compound employed to form the binder, and the mixture of excess alumina and binder thus formed admix with the remaining constituents of the cement, proper allowance being made for the excess of alumina present in the binder.

In the setting of the cement there is substantially no contraction and consequently hard molded articles may be made therefrom with great accuracy. As the temperature required for setting is relatively low, metal inserts may be molded in the plastic without danger of loosening during setting and consequently are very firmly held. Molded articles prepared from the cement may be given an impervious surface finish by impregnation with paraffine wax, carnauba wax, asphaltic and bituminous material, fats, and the like. This may suitably be effected by immersing the articles in the melted wax. By impregnation of the molded article with hard waxes of the character of carnauba wax, their elasticity and resiliency may be increased. Where highly elastic or resilient molded articles are desired, a suitable filler should likewise be selected; for example, crushed glass.

In connection with the molding of commercial articles I have found it advantageous to admix a small proportion, say ½ to 3% of light lubricant oil, for example kerosene, with the cement. One per cent has been found to be a satisfactory proportion. The presence of this small proportion of lubricant oil appears to have the effect of retarding settling when admixed with the setting liquid prior to compression of the article in molding. When the article is compressed, the lubricant oil appears to be forced out, lubricating the surfaces of the die and preventing sticking thereto. The set of the molded article appears to be in no way affected.

For special uses in which the cement is to be molded or shaped in a highly plastic condition without pressure, and is to set rapidly, higher proportions of binder and of setting liquid should be employed than in the case of commercial cement intended for molding. Thus, by using a cement containing 50 to 60% of aluminate binder and mixing the cement with an equal proportion of setting liquid, a highly plastic material is obtained which, at ordinary temperatures, will set in five minutes or less. In the mixing of such a material it is advisable that artificial cooling be employed to retard setting. The plastic material may be readily molded into shape and set.

In such a cement translucency can be secured by use of crushed quartz or crushed glass as a filler. In such case it is preferred that the setting liquid contain no zinc oxide, zinc phosphate or other phosphates, but consist solely of phosphoric acid and water.

For the formation of electric heating bodies, a suitable heating element may be embedded in the cement, and secured to terminals which may, if desired, likewise be embedded in the cement. The heating element may suitably be of nickel chromium alloy, nickel, iron, etc. Resistance bodies may be formed by incorporating conductive filler material, for example, graphite, iron filings, etc., in the cement. Such a resistance body may be formed with terminals partially embedded in the mass and may be provided with insulation formed of the cement, the whole being set simultaneously.

The term "sintering" as used herein designates a superficial fusion of the particles of the material and may or may not be accompanied by agglomeration. The term "alkali forming metals", as used herein, designates the metals of the group including the alkali and alkaline earth metals.

I claim:

1. A cement capable of setting with a solution of phosphoric acid and adapted for press molding, said cement comprising a filler and from 2 to 10% of calcium aluminate as its effective bonding constituent.

2. A cement capable of setting with a solution of phosphoric acid and comprising a filler including silica and from 2 to 10% of an aluminate of an alkali forming metal as its effective bonding constituent.

3. A cement capable of setting with a solution of phosphoric acid and comprising a filler including silica and from 2 to 10% of calcium aluminate as its effective bonding agent.

4. A cement capable of setting with a solution of phosphoric acid and comprising a filler including silica, an inert material capable of combining with water and an aluminate of an alkali forming metal.

5. A cement capable of setting with a solution of phosphoric acid and comprising a filler including silica, a dehydrating filler and from 2 to 10% of an aluminate of an alkali forming metal as its effective bonding constituent.

6. A cement capable of setting with a solution of phosphoric acid and comprising a filler including silica, a dehydrating inert material and from 2 to 10% of calcium aluminate as its effective bonding constituent.

7. A cement capable of setting with a solution of phosphoric acid and comprising a filler including silica, alumina and an aluminate of an alkali forming metal.

8. A cement capable of setting with a solution of phosphoric acid and comprising a filler containing one part of alumina and two parts of crushed quartz and from 2 to 10% of an aluminate of an alkali forming metal.

9. A cement capable of setting with a solution of phosphoric acid and comprising a filler containing one part of alumina and two parts of crushed quartz, and 3 to 4% calcium aluminate.

10. The method of preparing a plastic mass capable of being molded under pressure which comprises admixing with a cement containing as a primary binding constituent an aluminate of an alkali forming metal, a setting liquid comprising phosphoric acid, the proportion of the latter being at least sufficient to wet the cement.

11. The method of preparing a plastic mass capable of being molded under pressure which comprises admixing with a cement containing calcium aluminate as a primary binding constituent, a setting liquid comprising phosphoric acid, the proportion of the latter being at least sufficient to wet the cement.

12. The method of preparing a plastic mass capable of being molded under pressure which comprises admixing with a cement containing from 2 to 10% of calcium aluminate as a primary binding constituent, a setting liquid comprising phosphoric acid and phosphates, the proportion of the liquid being at least sufficient to wet the cement.

13. The method of preparing a plastic mass capable of being molded under pressure which comprises admixing with a cement containing an aluminate of an alkali forming metal as a primary binding constituent and an inert filler compound capable of combining with water, a setting liquid comprising phosphoric acid, the proportion of the latter being at least sufficient to wet the cement.

14. The method of preparing a plastic mass capable of being molded under pressure which comprises admixing with a cement containing an aluminate of an alkali forming metal as a primary binding constituent and an inert filler capable of combining with phosphoric acid, a setting liquid comprising phosphoric acid, the proportion of the latter being from 2 to 10%.

15. The method of preparing a plastic mass capable of being molded under pressure which comprises admixing with a cement containing from 2 to 10% of an aluminate of an alkali forming metal and an inert filler including alumina, a setting liquid comprising phosphoric acid, the proportion of the latter being at least sufficient to wet the cement.

16. The method of preparing a plastic mass capable of being molded under pressure which comprises admixing with a cement containing from 2 to 10% of an aluminate of an alkali forming metal as a primary binding constituent and an inert filler including asbestos, a setting liquid comprising phosphoric acid, the proportion of the latter being at least sufficient to wet the cement.

17. The method of preparing a plastic mass capable of being molded under pressure which comprises admixing with a cement containing an aluminate of an alkali forming metal as a primary binding constituent and an inert filler including a material capable of combining with water, a setting liquid comprising phosphoric acid, the proportion of the latter being at least sufficient to wet the cement, the proportion of the filler material capable of combining with water being selected to control the rate of set by varying the concentration of the setting liquid.

18. The method of preparing a plastic mass capable of being molded under pressure which comprises admixing with a cement containing an aluminate of an alkali forming metal as a primary binding constituent and an inert filler including a material capable of combining with phosphoric acid, a setting liquid comprising phosphoric acid, the proportion of the latter being at least sufficient to wet the cement and the proportion of the filler material capable of combining with phosphoric acid being selected to control the rate of set by varying the concentration of the setting liquid.

19. The method of preparing a plastic mass capable of being molded under pressure which comprises admixing with a cement containing from 2 to 10% of an aluminate of an alkali forming metal as a primary binding constituent and an inert filler containing 20 to 33⅓% of alumina, a setting liquid comprising phosphoric acid, the proportion of the latter being at least sufficient to wet the cement.

20. The method of preparing a plastic mass capable of being molded under pressure which comprises admixing with a cement containing 2 to 10% of an aluminate of an alkali forming metal as a primary binding constituent and an inert filler containing 33⅓% of alumina, a setting liquid comprising phosphoric acid, the proportion of the latter being at least sufficient to wet the cement.

21. The method of preparing a plastic mass capable of being molded under pressure which comprises admixing with a cement containing an aluminate of an alkali forming metal as a primary binding constituent, a setting liquid comprising phosphoric acid and zinc phosphate in proportion at least sufficient to wet the cement.

22. The method of preparing a plastic mass capable of being molded under pressure which comprises admixing 100 parts of a cement containing about 3% of calcium aluminate and an inert filler containing one part of alumina to two parts of silica with 35 parts of a setting liquid containing phosphoric acid and zinc phosphate.

23. The method of preparing a plastic mass capable of being molded under pressure which comprises admixing a cement containing from 2 to 10% of an aluminate of an alkali forming metal as a primary binding constituent, a setting liquid comprising phosphoric acid in proportion at least sufficient to wet the cement and a small proportion of a light lubricating oil.

24. The method of preparing a plastic mass capable of being molded under pressure which comprises admixing a cement containing from 2 to 10% of an aluminate of an alkali forming metal, a setting liquid comprising phosphoric acid in proportion at least sufficient to wet the cement and about 1% of kerosene.

25. A moldable, setting plastic mass comprising a filler, an aluminate of an alkali forming metal, phosphoric acid and water.

26. A moldable, setting plastic mass comprising a filler, at least 2% of calcium aluminate, phosphoric acid and water.

27. A moldable, setting plastic mass comprising a filler including a substance capable of combining with water, at least 2% of an aluminate of an alkali forming metal, phosphoric acid and water.

28. A moldable, setting plastic mass comprising a filler including a substance capable of combining with water, about 3% of calcium aluminate, phosphoric acid and water.

29. A moldable, setting plastic mass comprising a filler including alumina, at least 2% of an aluminate of an alkali forming metal, phosphoric acid and water.

30. A moldable, setting plastic mass comprising a filler including silica and alumina, at least 2% of an aluminate of an alkali forming metal, phosphoric acid and water.

31. A moldable, setting plastic mass comprising a filler including silica and alumina, from 2 to 10% of calcium aluminate, phosphoric acid and water.

32. A moldable plastic mass including a filler, at least 2% of an aluminate of an alkali forming metal, a small proportion of a light lubricating oil, phosphoric acid and water.

WILLIAM HOSKINS.